(12) United States Patent
Suh (10) Patent No.: US 8,055,121 B2
(45) Date of Patent: Nov. 8, 2011

(54) PVR SYSTEM, AND METHOD FOR RECORDING VIDEO BY USING THE SAME

(75) Inventor: Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 1278 days.

(21) Appl. No.: 10/751,410

(22) Filed: Jan. 6, 2004

(65) Prior Publication Data

US 2004/0151474 A1    Aug. 5, 2004

(30) Foreign Application Priority Data

Jan. 7, 2003  (KR) .......................... 10-2003-0000823

(51) Int. Cl.
*H04N 5/76* (2006.01)
*H04N 5/92* (2006.01)

(52) U.S. Cl. ........................................ 386/291; 386/326

(58) Field of Classification Search ................. 386/83, 386/46

See application file for complete search history.

(56) References Cited

U.S. PATENT DOCUMENTS

| | | | | |
|---|---|---|---|---|
| 5,737,477 A * | 4/1998 | Tsutsumi | .......................... | 386/83 |
| 6,636,270 B2 * | 10/2003 | Gates et al. | .................... | 348/512 |
| 2002/0021886 A1 * | 2/2002 | Nakajima et al. | ............... | 386/46 |
| 2002/0110360 A1 * | 8/2002 | Potrebic | .......................... | 386/83 |
| 2002/0188945 A1 * | 12/2002 | McGee et al. | .................... | 725/39 |
| 2003/0014557 A1 * | 1/2003 | Berger et al. | .................. | 709/318 |
| 2003/0099462 A1 * | 5/2003 | Matsugami | ..................... | 386/83 |
| 2004/0002987 A1 * | 1/2004 | Clancy et al. | .................. | 707/101 |
| 2007/0031111 A1 * | 2/2007 | Thiagarajan et al. | ........... | 386/83 |

FOREIGN PATENT DOCUMENTS

| | | |
|---|---|---|
| JP | 12-312323 | 7/2000 |
| JP | 12-041211 | 8/2000 |

\* cited by examiner

*Primary Examiner* — William Vaughn, Jr.
*Assistant Examiner* — Asher Khan
(74) *Attorney, Agent, or Firm* — Birch, Stewart, Kolasch & Birch, LLP (57) ABSTRACT

PVR system, and method for recording a video by using the same, the PVR system including a channel demodulating part for receiving, and demodulating a broadcasting program on a particular channel, a storage medium for storing the broadcasting program, an EPG parsing part for extracting information on the broadcasting program intended to record from a data demodulated at the channel demodulating part, an upload/download controlling part for receiving the broadcasting program intended to record from the channel demodulating part, storing the broadcasting program in the storage medium, and controlling reproduction of the broadcasting program stored in the storage medium in response to an external recording/reproduction signal, and controlling the EPG parsing part, and a re-recording processing part for storing identifying information for identifying success of recording of the broadcasting program intended to record and information on the broadcasting program intended to record, and identifying the identifying information, to request re-transmission of the broadcasting program intended to record through a network when recording of the broadcasting program intended to record fails, or to renew the information on the broadcasting program intended to record.

20 Claims, 4 Drawing Sheets

PVR SYSTEM, AND METHOD FOR RECORDING VIDEO BY USING THE SAME

This application claims the benefit of the Korean Application No. P2003-0000823 filed on Jan. 7, 2003, which is hereby incorporated by reference.

BACKGROUND OF THE INVENTION

1. Field of the Invention

The present invention relates to a PVR system, and a method for recording a video by using the same.

2. Background of the Related Art

The Personal Video Recorder (PVR) provides functions improved much more than an existing Video Cassette Recorder (VCR), such as a recording function undoubtedly, a time shift function, an instant replay function during watching a live program, and other trick play functions.

Moreover, the PVR attracts users very much in that the user can store, and watch a high quality digital broadcasting of an HD (High Definition) class whenever the user desires, and the various program specific services are available.

However, in a case a related art PVR fails recording due to an erratic environment that can take place physically, with which the related art PVR has almost no way for dealing. For an example, in a case blackout takes place in a state a scheduled recording is set, recording of the program itself becomes impossible. Moreover, the failure of recording due to physical problem of the hard disc may also cause a serious problem.

Along with this, in a case damage to a data is caused by a problem at an antenna, or an error caused in a course of a broadcasting signal reception, such as weakening of a received signal, though the program itself is recorded, a result is occurred, in which the user receives a damaged data due to the damage to the data by the transmission error. Particularly, when the broadcasting reception error is occurred over a long time period, the video data is destroyed over a substantial number of frames.

In addition to this, the related art PVR has a limit in that two or more than two programs can not be recorded at a same time. In this case, there is no method for watching or recording the program of which recording is failed in the related art method.

Therefore, a method is required, in which the user can have the program re-supplied thereto in a case problems described above are taken place.

SUMMARY OF THE INVENTION

Accordingly, the present invention is directed to a PVR system, and a method for recording a video by using the same that substantially obviates one or more of the problems due to limitations and disadvantages of the related art.

An object of the present invention is to provide a PVR system, and a method for recording a video by using the same, in which, when a user fails recording of a desired program, the failure is automatically sensed, and the program is supplied to the user again, for providing improved digital broadcasting and recording environment to the user.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the PVR system includes a channel demodulating part for receiving, and demodulating a broadcasting program on a particular channel, a storage medium for storing the broadcasting program, an EPG parsing part for extracting information on the broadcasting program intended to record from a data demodulated at the channel demodulating part, an upload/download controlling part for receiving the broadcasting program intended to record from the channel demodulating part, storing the broadcasting program in the storage medium, and controlling reproduction of the broadcasting program stored in the storage medium in response to an external recording/reproduction signal, and controlling the EPG parsing part, and a re-recording processing part for storing identifying information for identifying success of recording of the broadcasting program intended to record and information on the broadcasting program intended to record, and identifying the identifying information, to request re-transmission of the broadcasting program intended to record through a network when recording of the broadcasting program intended to record fails, or to renew the information on the broadcasting program intended to record.

The channel demodulating part includes a channel receiving part for tuning to, and demodulating a broadcasting signal on a particular channel, and forwarding in a form of a transport TP stream, and a TP processing part for splitting the TP stream from the channel receiving part into an audio PES stream, a video PES stream, and a data stream.

The information on the broadcasting program extracted at the EPG parsing part is channel information, a record starting time, and a record end time, of the broadcasting program intended to record, and the record starting time is a starting time of the program intended to record if the recording is a scheduled recording, and a time when a recording/time shift button is pressed if the recording is a direct recording or a time shift.

The upload/download controlling part initializes a recording flag value at the re-recording processing part to a first identifying information value in response to an external recording signal, sets the first identifying information value to a second identifying information value if the recording of the broadcasting program intended to record is successful, and maintains the first identifying value as it is if the recording of the broadcasting program intended to record fails.

The re-recording processing part includes a recording parameter storage part for storing identifying information for identifying success of recording of the broadcasting program intended to record, and information on the broadcasting program intended to record, and a network interface part for identifying the identifying information, to request re-transmission of the broadcasting program intended to record through a network when recording of the broadcasting program intended to record fails, or to renew the information on the broadcasting program intended to record.

In other aspect of the present invention, there is provided a method for recording a video in a PVR system having a storage medium for storing a broadcasting program intended to record, and a re-recording processing part having a recording parameter storage part and a network interface part, including the steps of setting a recording parameter field at the recording parameter storage part, and storing information on the broadcasting program intended to record and identifying information for identifying success of recording of the broadcasting program in the recording parameter field, according to user's recording setting information, writing the broadcasting program on the storage medium according to the information on the broadcasting program, determining success of recording of the broadcasting program according to the identifying information, and if the recording of the broadcasting program fails as a result of the determination, requesting re-transmission of the broadcasting program intended to record through the network interface part, or renewing the information on the broadcasting program stored in the recording parameter storage part.

The user's recording setting information is information related to at least one of recording, scheduled recording, time shift.

The method further includes the steps of (a) determining successive recording of the broadcasting program intended to record, and (b) changing identifying information value stored in the recording parameter storage part if the recording is successful as a result of the determination, and maintaining the identifying information value stored in the recording parameter storage part as it is if the recording fails, after the step of writing the broadcasting program on the storage medium.

The step (b) includes the steps of resetting the identifying information value set to '1' at the recording parameter storage part to '0' if the recording is successful as a result of the determination, and maintaining the identifying information value set to '1' at the recording parameter storage part as it is if the recording fails.

The method further includes the step of changing the identifying information value stored in the recording parameter storage part if there is a user's record stop request.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

The present invention suggests a PVR system and a method for recording a program by using the same, which can deal with a case when a user fails to record a desired program due to various unexpected erratic environments at the PVR or the like.

Figure 1:
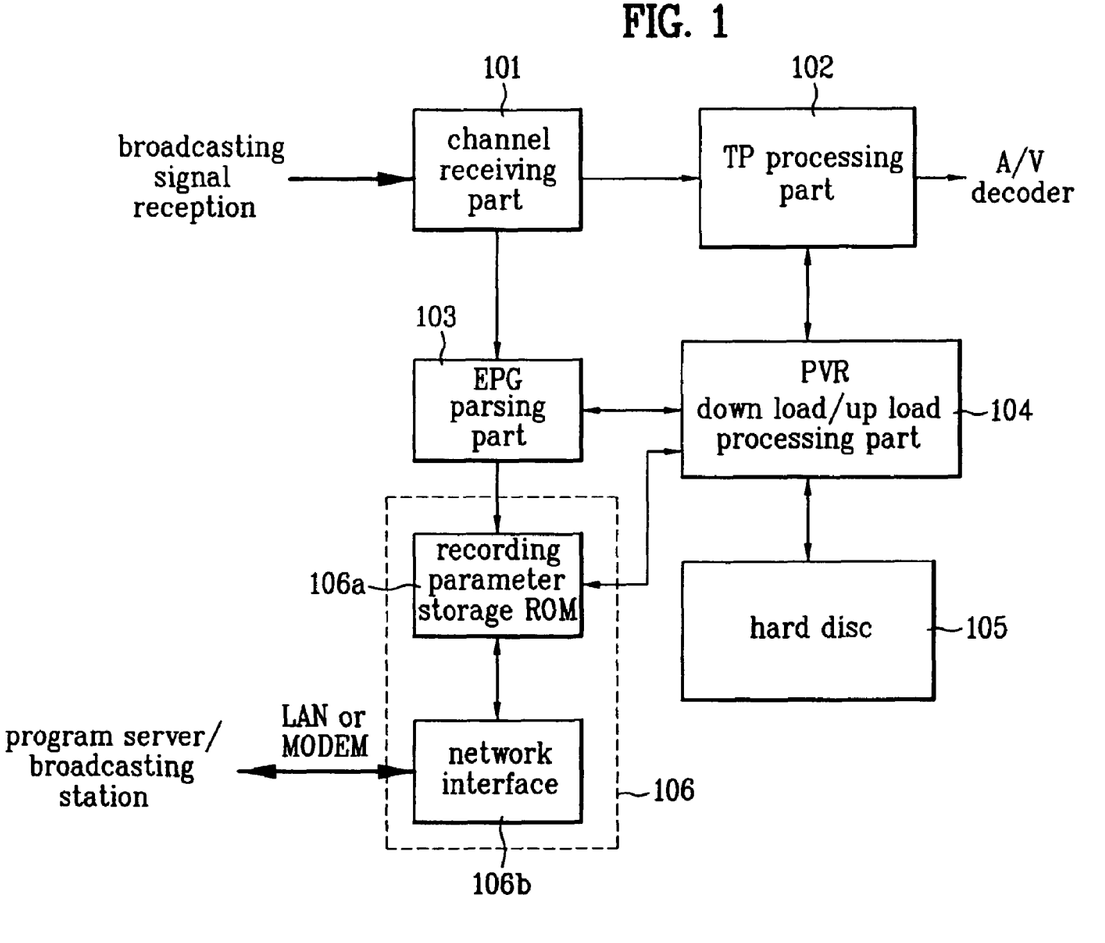
FIG. 1 illustrates a block diagram of a PVR system in accordance with a preferred embodiment of the present invention.

FIG. 1 illustrates a block diagram of a PVR (Personal Video Recorder) system in accordance with a preferred embodiment of the present invention.

Referring to FIG. 1, the PVR system includes a channel demodulating part having a channel receiving part 101, and a TP processing part 102, a storage medium, such as a hard disc 105 or the like, an EPG parsing part 103, an upload/download controlling part 104, and a re-recording processing part 106 having a recording parameter storage part 106a and a network interfacing part 106b.

The channel receiving part 101 in the channel demodulating part tunes to, and demodulates a broadcasting signal of a particular channel, to forward the broadcasting signal in a form of a transport TP stream, and the TP processing part 102 splits the TP stream from the channel receiving part 102 into an audio PES stream, a video PES stream, and a data stream.

The EPG parsing part 103 extracts broadcasting program information intended to record from the data demodulated at the channel demodulating part. That is, the EPG parsing part 103 parses program guide information (for an example EPG) from the TP stream from the channel receiving part 101, and extracts information on a broadcasting program intended to record. The information on the broadcasting program extracted from the EPG parsing part 103 can be channel information, a writing time period, and a writing end time of the recording program. In case of the scheduled recording, the record starting time is a starting time of the program to be recorded, and in case of direct recording or time shift, the record starting time can be a time when a recording/time shift button is pressed.

The upload/download controlling part 104 receives a broadcasting program intended to record from the TP processing part 102, and stores the broadcasting program in the hard disc 105, and controls reproduction of the broadcasting program stored in the hard disc 105 in response to an external recording/reproduction signal, and controls the EPG parsing part 103.

The upload/download controlling part 104 initializes a first identifying information value at a re-recording processing part in response to an external recording signal, sets the first identifying information value to a second identifying information value if the recording of the broadcasting program intended to record is successful, and maintains the first identifying information value as it is if the recording of the broadcasting program intended to record is not successful. The first identifying information value may be set to '1', and the second identifying information value may be set to '0'.

The re-recording processing part 106 stores identifying information for identifying a success of recording of the broadcasting program intended to record, and information on the broadcasting program intended to record, and identifies the identifying information, and requests re-transmission of the broadcasting program intended to record through a network if the recording of the broadcasting program intended to record fails, or renew information on the broadcasting program intended to record.

In the re-recording processing part 106, the recording parameter storage part 106a stores identifying information for identifying a success of recording of the broadcasting program intended to record, and the network interface part 106b identifies the identifying information, to request re-transmission of the broadcasting program intended to record through a network, if the recording of the broadcasting program intended to record fails, or renew information on the broadcasting program intended to record. The recording parameter storage part 106a can be a ROM (Read-Only Memory).

Figure 2:
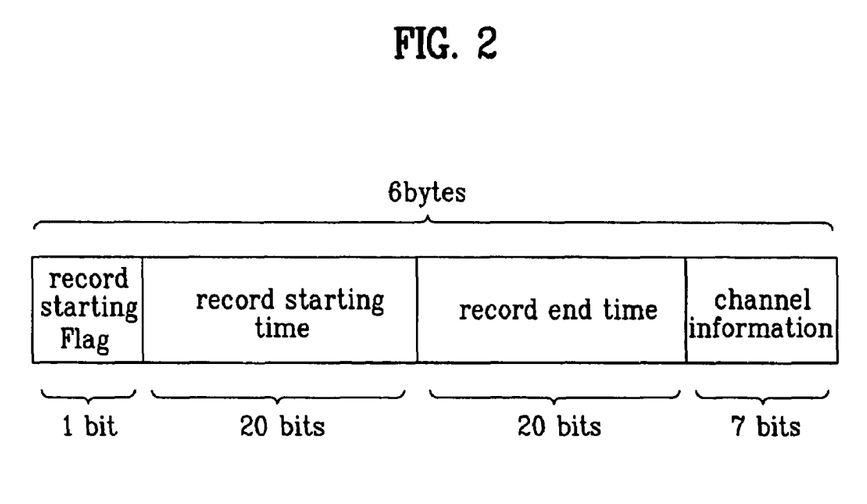
FIG. 2 illustrates a diagram of one embodiment of the recording parameter storage part in FIG. 1.

Referring to FIG. 2, the recording parameter storage part 106a may have one bit of identifying information field, 20 bits of record starting time field, 20 bits of record end time field, and 7 bits of channel information field.

Figure 3:
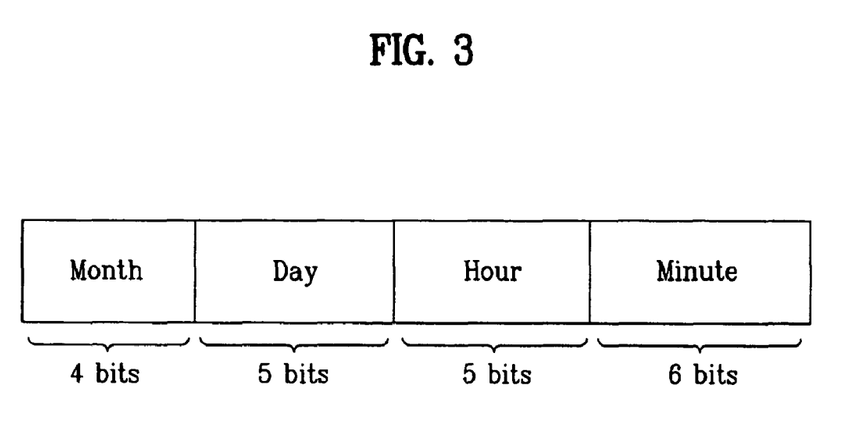
FIG. 3 illustrates a diagram of one embodiment of a record starting, or end field of the recording parameter in FIG. 2.

Referring to FIG. 3, the record starting time field or the record end time field may have 4 bits of month field, 5 bits of day field, 5 bits of hour field, and 6 bits of minute field.

The network interface part 106b can be a LAN or a modem, for connection to, and communication with a program server, or a broadcasting station.

The operation of the PVR of the present invention will be described.

In the case of scheduled recording, basic information on the broadcasting program to be recorded, i.e., information on a channel the program to be recorded is to be broadcasted thereon, and writing starting/end times are extracted from the EPG parsing part 103, and stored in the recording parameter storage part 106a.

Then, a record starting flag, information for identifying success of recording, is set to '1', which value is maintained until the writing ends regularly.

If it is intended to record or time shift the broadcasting program watching presently, the recording parameter storage part 106a stores channel information on the program being written presently extracted at the EPG parsing part 103, a time the user presses the recording/time shift button as the record starting time, and a time the present program ends based on EPG information on the present program, as the record end time. The record end time may be a time the user enters.

In this instance too, the record start flag is set to '1', and maintained the value '1' until the writing ends regularly.

The condition of regular end of writing is successive storage of the program on the hard disc without disconnection until the record end time comes, or a forced end of the record by the user.

The forced end of the record by the user can be identified with reception of a signal from a remote controller, which is distinctive from irregular writing end caused by a situation, such as blackout.

FIG. 2 illustrates a diagram of one embodiment of the recording parameter storage part 106a in FIG. 1, which requires 6 bytes of storage space for storage of information of programs to be recorded.

The ROM is used as the recording parameter storage part 106a because a non-volatile storage space is required for maintaining information on a program writing of which ends irregularly, even if a situation like a blackout takes place.

Referring to FIG. 2, the first bit of the recording parameter, the record starting flag, is information on success of writing of the program, and set to '1' when the writing starts or a scheduled recording is carried out. A value of the record starting flag is maintained to be '1' until the writing ends regularly, and reset to '0' when the writing ends, regularly. Of the recording parameters, the record starting time and the end time information requires spaces as much as 20 bits respectively, and channel information on the recording program occupies a low order 7 bit space.

FIG. 3 illustrates a diagram of one embodiment of a record starting, or end field of the recording parameter in FIG. 2. The field has day and time information stored therein. Of the day information, months with values ranging 1 to 12 can be represented with 4 bits, and days with values ranging 1 to 31 can be represented with 5 bits. Of the time information, hours with values ranging 1 to 24 can be represent with 5 bits, and minutes with values ranging 1 to 60 can be represented with 6 bits. According to this, the record starting or end time field has 20 bits.

The recording channel information, and the record starting, and end times stored in the recording parameter storage part 106a are transmitted to a server through the network interface part 106b when the recording fails, and then, the server matches the channel information and the broadcasting time information to a broadcasting programming information, and re-transmits the program the user desires, exactly. The server may be a program provider who supplies programs, or a broadcasting station.

Figure 4:
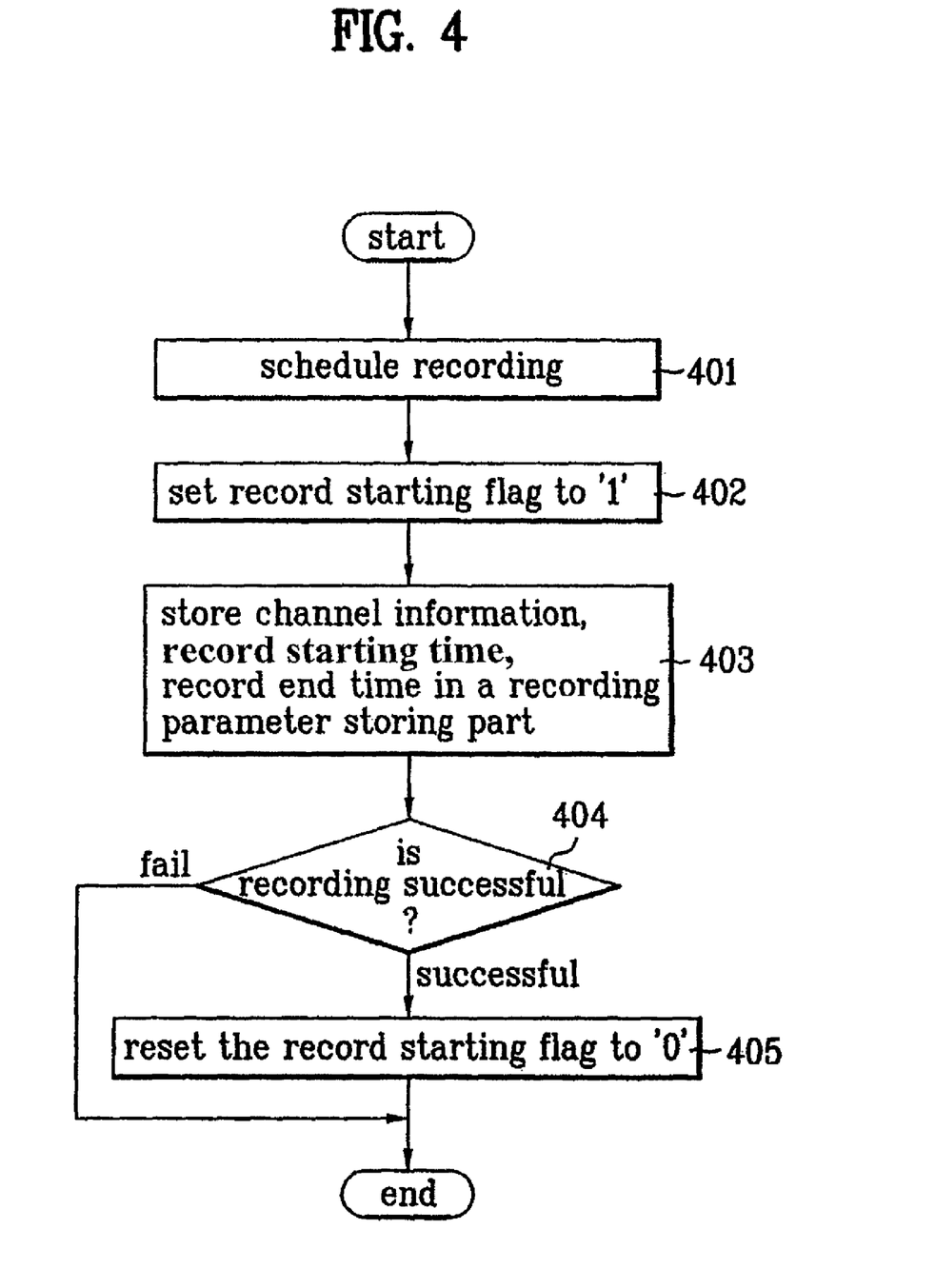
FIG. 4 illustrates a flow chart showing the steps of a method for making a scheduled recording with a PVR system of the present invention.

FIG. 4 illustrates a flow chart showing the steps of a method for making a scheduled recording with a PVR system of the present invention.

When a user sets a scheduled recording of a particular program (step 401), a value of a record starting flag is set to '1' (step 402), and information on the program selected as the scheduled recording, a record starting time, and a record end time the user enters are stored in a recording parameter storage part 106a (step 403).

Then, regular end of the writing at a set scheduled writing time is determined (step 404).

That is, if the program is stored on the hard disc without disconnection successively starting from the record starting time to the record end time stored in the recording parameter storage part 106a, or the user ends the writing forcibly in the middle of the writing with a remote controller, the recording is determined to be successive, and the value of the record starting flag is set to '0' (step 405).

As described before, a case the writing ends irregularly due to a situation like blackout is a case when the system itself is stopped irregularly. Thus, when the writing stops irregularly, the system can not know the irregular stop of the writing. In this case, when the system is restored, the system can not detect the failure of writing of the program with reference to the record starting flag.

Moreover, the irregular writing can take place when the data overflows the hard disc in a general recording, when other program stored the earliest can be erased under a certain rule set up in advance. Furthermore, a writing error may be caused by a defective sector on the hard disc due to a physical problem, when the system of the present invention can be effective. If writing stops due to an error during writing, the data may be received again from a server starting from a part the writing is stopped therefrom.

That is, if a time point where the present writing stops is stored as the record starting time, a request for re-transmission of the program starting from the part where the writing stops may be made, or request for re-transmission of the program fully may be made if the record starting time is not changed. At the time of fabrication of the system of the present invention, it can be set as desired.

Moreover, a stream error may occur due to a physical problem at a channel end during writing.

In this case, an error flag register may be set, for adjusting the record starting flag with reference to the error flag register.

Re-transmission of a program, of which data damage or stream error takes place continuously, may be made to the server, automatically. The time for requesting re-transmission of the program may differ slightly according to error conditions.

For an example, in a case of writing failure due to blackout, the program re-transmission is carried out after restoration of the power, and in a case defective data is recorded due to physical error of the channel and a case the writing failure comes from a hard disc error, the request for the re-transmission is made after the record end time passes.

The present invention is applicable to a case when many programs are to be scheduled recorded. That is, if N programs are to be scheduled recorded, N bit size record starting vector may be set by storing N-6 byte size parameters, or collecting only the record start flags, separately.

Moreover, the present invention enables recording of two or more than two programs broadcasted in the same time band with one PVR. That is, when it is intended to record two or more than two programs at the same time, at first, it is required that scheduling of recording of the two programs can be made.

In this instance, a method may be used, in which one program is written while the other program that is scheduled to be written at the time band is taken as a writing failed program, to request the server re-transmission of the program.

Figure 5:
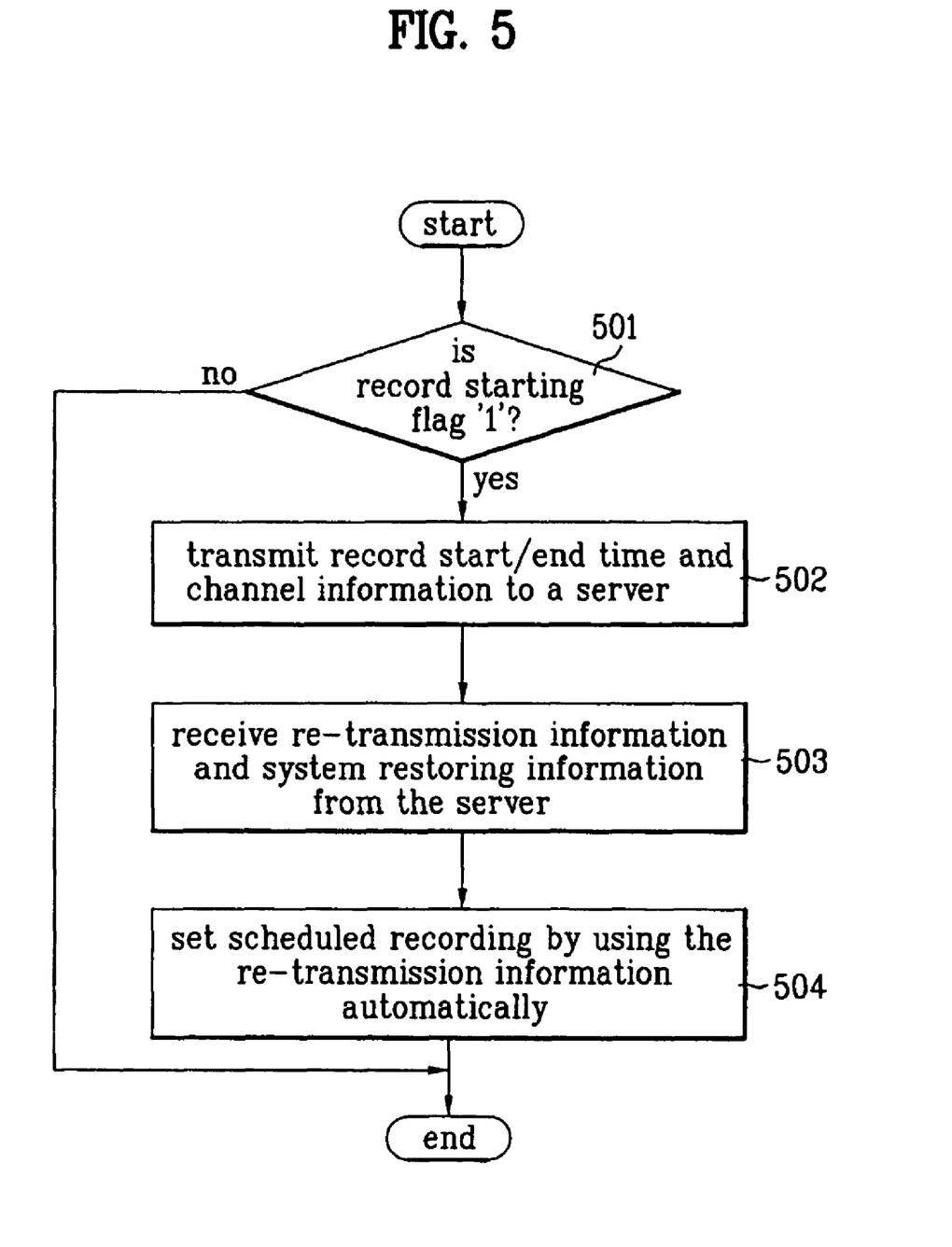
FIG. 5 illustrates a flow chart showing the steps of a method for determining failure of scheduled recording and requesting program re-transmission, with a PVR system of the present invention.

FIG. 5 illustrates a flow chart showing the steps of a method for detecting failure of scheduled recording and requesting program re-transmission, with a PVR system of the present invention, at a time of blackout.

That is, if power is restored after the blackout, the PVR searches values stored in the recording parameter storage part 106a for a program of which writing is failed (step 501). If the writing is failed due to different causes, such as blackout, the value of the record starting flag is kept to be '1'. That is, the record starting flag with a value '1' represents under writing or failure of writing.

Therefore, the system determines the record starting flag with a value '1' as a writing failure if the value of the record starting flag is '1' even after the record end time of the program passes, or system power is restored after blackout. Then, the system transmits the record starting time and the record end time, and channel information to the server through the network interface part 106b (step 502).

The server matches the channel information and broadcasting time information with the broadcasting programming information, and re-transmits the program desired by the user (step 503).

If the black out lasts for a long time, time information in the PVR system is also damaged. Therefore, the system requests the server present time information through the network interface part 106b as a default. Then, the system can restore the present time information by using the time information received from the server through a LAN or MODEM. Once the present time information is restored, the system receives a re-transmission starting time, a re-transmission end time, and channel information the program is to be re-transmitted thereon, of the program of which writing fails from the server, and stores in the recording parameter storage part 106a. The information on the re-transmission from the server is overwritten on a region of the ROM having the information on the program of which writing fails stored thereon, originally.

At the same time with this, by using the stored record starting time, and record end time, scheduling of writing of the program is made automatically (step 504). Therefore, since a scheduled recording can be carried out automatically in a case program writing fails, a convenience can be provided to the user.

The program re-transmission can be made by using a dedicated line between the PVR and the server, when a hardware for processing video/audio streams received through the dedicated line is required.

Moreover, at the time of writing failure, the system may make the request for program re-transmission and the reception of the program, not to/from the server, but to/from the broadcasting station, directly. That is, when re-transmission of the program of which writing fails is requested to the broadcasting station of the channel having the program broadcasted thereon, the broadcasting station can re-transmit the program on a sub-channel or the like. In this instance, the system transmits channel information and broadcasting time to the user, based on which information, the scheduled recording can be carried out.

The present invention is also operable as follows.

At first, the system receives recording set information from the user. The user's recording set information may be at least one of recording, scheduled recording, time shift. Then, the system sets recording parameter fields in the recording parameter storage part according to the user's recording set information, and stores broadcasting program information intended to record, and identification information that enables identification of success of writing in the recording parameter fields.

The recording parameter field may include one bit of identification information, 20 bits of record starting time field, 20 bits of writing end time field, and 7 bits of channel information field, and the like.

The record starting time field or the record end time field may include four bits of month field, five bits of day field, five bits of time field, and six bits of minute field. The identifying information stored on the recording parameter field is set to '1', and the broadcasting program information may be recording program channel information, a record starting time, and record end time.

Then, the system writes the broadcasting program on a storage medium according to the broadcasting program information. Then, the system determines if writing of the broadcasting program intended to record is finished successfully. If the writing is successful as a result of the determination, the value of the identifying information in the recording parameter storage part is changed, and, if the writing fails, the value of the identifying information in the recording parameter storage part is maintained as it is.

That is, if the writing is successful, the identifying information set to '1' at the parameter storage part is reset to '0', and if the writing fails, the identifying information set to '1' at the recording parameter storage part is maintained as it is. In a case there is a request from the user to end the writing, the identifying information set at the recording parameter storage part can be changed.

Next, the system determines if the writing of the broadcasting program according to the identifying information is successful. As a result of the determination, if the writing of the broadcasting program fails (if the identifying information set to '1' at the parameter storage part is maintained as it is), the system requests re-transmission of the broadcasting program intended to record through the network interface part, or renews the broadcasting program information stored in the recording parameter storage part.

As has been described, the PVR system, and method for recording a video by using the same of the present invention permits to request re-transmission of a program so that a user can record the program successfully later in a case irregular writing stop or writing failure takes place due to blackout, a physical error in a broadcasting reception environment, data overflow of the hard disc, or defective sector.

The automatic processing of program re-transmission together with scheduled recording made by communication between a server and a PVR system provides convenience to the user as manual operation of the user is reduced.

The present invention provides an effect of permitting to record two or more than two programs broadcasted within the same time band by writing one program while leaving the other program to fail writing, and receiving the other program later from a server again to write the other program.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A recording system for recording a broadcasting program comprising:
    a channel demodulating part configured to receive and demodulate the broadcasting program on a particular channel;
    a storage medium configured to record the broadcasting program;
    a controller configured to select the broadcasting program from among a plurality of broadcasting programs scheduled to be recorded onto the storage medium starting at a same time, to set a value for an identifying information corresponding to the selected broadcasting program to a first value when the selected broadcasting program first starts to be recorded on the storage medium, to set a value for identifying information corresponding to non-selected broadcasting programs to the first value and to change the value of the identifying information corresponding to the selected broadcasting program to a second value when the selected broadcasting program is successfully recorded onto the storage medium or maintain the value of the identifying information corresponding to the selected broadcasting program to the first value when the selected broadcasting program fails to be successfully recorded onto the storage medium; and a recording processing part configured to store identifying information, recording start time, recording end time and channel information corresponding to broadcasting programs scheduled to be recorded onto the storage medium, to read the identifying information corresponding to broadcasting programs scheduled to be recorded onto the storage medium, and to automatically request a network server for the re-transmission of a broadcasting program for recording whose previous attempt at recording onto the storage medium failed and without waiting for the network server to rebroadcast the program for recording, wherein the request to the network server includes a recording start time, recording end time and channel information for the broadcast program requested to be re-transmitted for recording.

2. The recording system as claimed in claim 1, wherein the channel demodulating part includes:
    a channel receiving part configured to tune to and demodulate a broadcasting signal on a particular channel, and to forward in a form of a transport TP stream; and
    a TP processing part configured to split the TP stream from the channel receiving part into an audio PES stream, a video PES stream, and a data stream.

3. The recording system as claimed in claim 1, wherein the storage medium is a hard disc.

4. The recording system as claimed in claim 1, wherein the first value of the identifying information set by the controller is '1', and the second value of the identifying information set by the controller is '0'.

5. The recording system as claimed in claim 1, where in the recording processing part stores the identifying information and the information on the broadcasting program for recording in a ROM (read-only memory).

6. The recording system as claimed in claim 1, wherein the stored information includes one bit of an identifying information field, 20 bits of a record starting time field, 20 bits of a record end time field, and 7 bits of a channel information field.

7. The recording system as claimed in claim 6, wherein the record starting time field or the record end time field includes 4 bits of a month field, 5 bits of a day field, 5 bits of an hour field, and 6 bits of a minute field.

8. The recording system as claimed in claim 1, wherein the network server is accessed via at least one of a LAN Card and a MODEM.

9. The recording system as claimed in claim 1, wherein the network server includes a program server or a broadcasting station for communication.

10. A method for recording a broadcasting program in a recording system having a storage medium for storing the broadcasting program intended to record, and a recording processing part having a recording parameter storage part and a network interface part, the method comprising:
    selecting a broadcasting program from among a plurality of broadcasting programs scheduled to be recorded on the storage medium at a same time;
    setting a value for an identifying information corresponding to the selected broadcasting program to a first value, setting a value for identifying information corresponding to the non-selected broadcasting programs to the first value, and storing information corresponding to the broadcasting programs scheduled to be recorded on the storage medium in the recording processing part, wherein the identifying information corresponding to the selected broadcasting program and non-selected broadcasting programs are also stored in the recording processing part;
    recording the selected broadcasting program on the storage medium according to the information on the selected broadcasting program;
    determining the success of the recording of the selected broadcasting program;
    changing the value of the identifying information corresponding to the selected broadcasting program to a second value if the recording of the selected broadcasting program is successful, and maintaining the value of the identifying information corresponding to the selected broadcasting program to the first value if the recording of the selected broadcasting program fails; and automatically requesting re-transmission to a network server for a broadcasting program for recording whose previous attempt at recording onto the storage medium failed and without waiting for the network server to rebroadcast the program for recording,
    wherein the request to the network server includes a recording start time, recording end time and channel information for the broadcast program requested to be re-transmitted for recording.

11. The method as claimed in claim 10, wherein recording setting information is stored in the recording processing part that includes at least one of a recording operation, a scheduled recording operation, and a time shift operation.

12. The method as claimed in claim 10, wherein a recording parameter field stored in the recording processing part includes one bit of an identifying information field, 20 bits of a record starting time field, 20 bits of a record end time field, and 7 bits of a channel information field.

13. The method as claimed in claim 12, wherein the record starting time field or the record end time field includes 4 bits of a month field, 5 bits of a day field, 5 bits of an hour field, and 6 bits of a minute field.

14. The method as claimed in claim 10, wherein the information on the broadcasting program includes channel information, a record starting time, and a record end time of the recording program, and the record starting time is a starting time of the program intended to record in a case of the scheduled recording, and a time when a recording/time shift button is pressed in a case of a direct recording or a time shift operation.

15. The method as claimed in claim 10, further comprising:
   resetting the value of the identifying information corresponding to the selected broadcasting program to '0' if the recording is successful; and
   controlling to maintain the value of the identifying information corresponding to the selected broadcasting program to '1' if the recording fails.

16. The method as claimed in claim 10, further comprising: changing the value of the identifying information corresponding to the selected broadcasting program to the second value if there is a user's record stop request.

17. The method as claimed in claim 10, wherein the re-transmission of the broadcasting program includes a program ID for matching to the program.

18. The method as claimed in claim 10, further comprising:
   if the recording of the selected broadcasting program fails as a result of the determination, renewing the information on the selected broadcasting program stored in the recording parameter storage part.

19. The method as claimed in claim 18, wherein the step of renewing the information on the selected broadcasting program stored in the recording parameter storage part further includes:
   re-receiving program related information from the program server or the broadcasting station; and
   overwriting the program related information on a relevant position of the recording parameter storage part, and scheduling writing of the program automatically by using a stored record starting time, and a record end time.

20. The method as claimed in claim 19, wherein the overwritten program related information includes channel information, a record starting time, and a record end time of a recording program.

* * * * *